US006694943B1

(12) United States Patent
Nozaki et al.

(10) Patent No.: US 6,694,943 B1
(45) Date of Patent: Feb. 24, 2004

(54) CYLINDER FOR INTERNAL COMBUSTION ENGINE AND METHOD OF TREATING INNER WALL SURFACE OF THE CYLINDER

(75) Inventors: Katsumasa Nozaki, Kanagawa (JP); Hiroshi Fukuda, Kanagawa (JP); Motoi Hashiba, Kanagawa (JP); Shinji Tsuchiya, Kanagawa (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 10/272,631

(22) Filed: Oct. 17, 2002

(30) Foreign Application Priority Data

Oct. 23, 2001 (JP) ....................................... 2001-324860

(51) Int. Cl.[7] ............................ F16J 10/02; C25D 3/20
(52) U.S. Cl. .................................................... 123/193.2
(58) Field of Search ............................ 123/193.2, 70 R; 204/26, 123; 205/239

(56) References Cited

U.S. PATENT DOCUMENTS 3,896,009 A * 7/1975 Kobayashi et al. ........... 204/26
4,221,639 A * 9/1980 Ninagawa et al. ....... 123/193.2
4,440,609 A * 4/1984 Blakeslee et al. ........... 204/123
4,706,417 A * 11/1987 Gary ....................... 123/193.2
5,683,568 A * 11/1997 Harris et al. ................ 205/259
6,216,649 B1 * 4/2001 Laydera-Collins ........ 123/70 R

OTHER PUBLICATIONS

Japanese Publication (B2) No. S56–18678 (1981) with English translation abstract thereof.

* cited by examiner

*Primary Examiner*—Marguerite McMahon
(74) *Attorney, Agent, or Firm*—Baker Botts LLP

(57) ABSTRACT

There is provided a cylinder for an internal combustion engine, wherein the inner wall surface of the cylinder which constitutes a slide-contacting surface for the piston is treated with a metal plating which is minimal in burden to the environment, excellent in abrasion resistance and hard enough to endure the practical use of the cylinder, thus making it possible to dispense with a finishing work such as honing work. A method for treating the inner wall surface of the cylinder so as to obtain such a cylinder is also provided. The cylinder as well as the method are featured in that the inner wall surface of the cylinder which is adapted to be slidably contacted with a piston is electroplated in a plating bath comprising an iron plating solution containing a boron compound such as trimethylamine borane, dimethylamine borane, etc.

7 Claims, 2 Drawing Sheets

CYLINDER FOR INTERNAL COMBUSTION ENGINE AND METHOD OF TREATING INNER WALL SURFACE OF THE CYLINDER

BACKGROUND OF THE INVENTION

1. Field of the Invention

The present invention relates to a cylinder made of an aluminum alloy, adapted to be used in an internal combustion engine and having a metal plating on the inner wall surface thereof, and also to a method of treating the inner wall surface of the cylinder. In particular, the present invention relates to cylinder which is suited for use in a small air-cooled two-stroke gasoline internal combustion engine to be employed in a portable power working machine such as a brush cutter or a chain saw.

2. Description of the Related Art

As for the conventional cylinder for a small air-cooled two-stroke gasoline internal combustion engine to be employed in a portable power working machine, a typical example thereof is constructed as shown in FIG. 2. The cylinder shown in FIG. 2 is generally formed of an aluminum alloy and constituted by an integral body consisting of a barrel portion 2 having a pair of columnar expanded portions **2*a* disposed opposite to each other, and a head portion 3 provided with a so-called squish dome-shaped combustion chamber 4. The barrel portion 2 is provided, all over the outer wall thereof, with a large number of cooling fins 19. Further, the head portion 3 is provided with an internal thread 18** for mounting an ignition plug thereon.

The inner wall surface (cylinder bore face) 9 of the barrel portion 2 is provided with an exhaust port 5 and also with an intake port 6, which are designed to be closed and opened by the movement of the piston 20. These intake port 6 and exhaust port 5 are disposed opposite to each other in such a manner that they are offset or dislocated level-wise from each other. The columnar expanded portions **2*a* are respectively provided therein with a hollow scavenging passageway 7 having an inner wall 7*a* of predetermined thickness, each hollow scavenging passageway 7 being spaced away from these intake port 6 and exhaust port 5 by an angle of 90 degrees in the circumferential direction of the cylinder bore 9. These scavenging passageways 7 are respectively provided, at a downstream end portion (upper end portion) thereof, with a scavenging port 8 which is inclined somewhat upward, i.e. in the direction away from where the intake port 6 of the cylinder bore 9 is located. This pair of scavenging ports 8 is also designed to be opened and closed by the movement of the piston 20**.

The cylinder 1 mentioned above is a so-called binary fluid scavenging type cylinder where a pair of scavenging ports 8 is symmetrically formed with respect to the longitudinal section F—F taken along the middle of the exhaust port 5. However, a so-called quaternary fluid scavenging type cylinder where a pair of scavenging ports is additionally provided therewith (two pairs in total) is also known.

As for the types of the scavenging passageway, there is also known, in addition to the hollow scavenging passageway provided with an inner wall as shown in FIG. 2 and a scavenging passageway having no inner wall (the side facing the cylinder bore is opened), another kind of scavenging passageway which is provided, at a lower portion thereof, with an opening extending along the length of the scavenging passageway while leaving a half-wall at an upper portion thereof, thereby enabling the air-fuel mixture that has been introduced into the scavenging port from the crank chamber via the scavenging passageway to be contacted with the skirt portion of the piston.

The cylinder 1 made of an aluminum alloy for use in a two-stroke internal combustion engine is usually manufactured by means of a die casting method such as a high-pressure die casting method, and thereafter, the inner wall surface 9 which is adapted to be slidably contacted with a piston is usually subjected to metal plating treatment (a layer of plating 10).

Conventionally, the metal plating treatment of the inner wall surface 9 of the cylinder 1 is performed by way of iron (Fe) plating or hard chromium (Cr) plating. In particular, the surface of plating that has been obtained by way of the hard chrome plating is excellent in performance as a piston-sliding face, so that the hard chrome plating is considered indispensable for manufacturing a high-performance engine.

However, hexavalent chromium which is employed in a plating bath of the hard chromium plating method imposes a great burden on the environmental safety, and therefore, is designated as one of the special chemical substances which are considered as polluting the environment. Therefore, it is recommended all over the world to minimize the employment of hexavalent chromium. On the other hand, iron plating is minimal in burden to the environment and relatively low in production cost. Accordingly, there is a movement automakers for example to apply an iron plating to the inner wall surface of the cylinder of an internal combustion engine. However, the layer of iron plating is inferior in physical properties as compared with the layer of chromium plating. In particular, there is a great difference in hardness between them. Specifically, the Vickers hardness of the layer of iron plating which is now produced is about 500 to 600(Hv[50 gf]), which is considerably low as compared with the Vickers hardness of the layer of chromium plating which is 850 to 1,000(Hv[50 gf]). Therefore, it would be impossible to put the iron plating, as it is, into practical use in place of the hard chromium plating.

Additionally, the conventional plating treatment is poor in precision and hence the layer of plating is non-uniform, varying in thickness depending on the regions of the inner wall surface which constitutes a slide-contacting surface for the piston. As a result, it has been considered necessary to perform a finishing work such as honing work after the plating of the inner wall surface.

BRIEF SUMMARY OF THE INVENTION

The present invention has been made to cope with the aforementioned circumstances, and therefore an object of the present invention is to provide a cylinder for an internal combustion engine, wherein the inner wall surface of the cylinder which constitutes a slide-contacting surface for the piston is treated with a metal plating which is minimal in burden to the environment, excellent in abrasion resistance and hard enough to endure the practical use of the cylinder, thus making it possible to dispense with a finishing work such as honing work.

Another object of the present invention is to provide a method of treating the inner wall surface of the cylinder, which is capable of obtaining an excellent cylinder as described above.

With a view to realize the aforementioned objects, there is provided, according to the present invention, a cylinder for an internal combustion engine, which is made of an aluminum alloy and is featured in that an inner wall surface of the cylinder which is adapted to be slidably contacted with a piston is electroplated in a plating bath comprising an iron plating solution containing a boron compound such as trimethylamine borane, dimethylamine borane, etc.

According to a preferable embodiment of the present invention, the layer formed on the inner wall surface by the electroplating is employed, as it is, as a finished surface without being subjected to a finishing work by means of honing, etc.

Preferably, the layer obtained by said electroplating has a Vickers hardness of 600 to 900(Hv[50 gf]). Further preferably, the deviation in thickness of the layer obtained by the electroplating all over the inner wall surface is confined within 15 $\mu$m.

Further, the cylinder for an internal combustion engine according to the present invention is constructed such that a head portion constituting the combustion chamber of the engine is formed integral with a barrel portion into which the piston is slidably inserted, and is particularly suited for use in a small air-cooled two-stroke gasoline engine to be employed in a portable power working machine.

In addition, the method of treating the inner wall surface of the cylinder for an internal combustion engine according to the present invention is featured in that an inner wall surface of the cylinder which is adapted to be slidably contacted with a piston is electroplated in a plating bath comprising an iron plating solution containing a boron compound such as trimethylamine borane, dimethylamine borane, etc.

It has been confirmed that when the inner wall surface of the cylinder which is adapted to be slidably contacted with a piston is electroplated in a plating bath comprising an iron plating solution containing a boron compound such as trimethylamine borane, dimethylamine borane, etc., the hardness of the layer of plating is considerably enhanced. More specifically, while the Vickers hardness of the layer of iron plating where the aforementioned borane is not added therein is about 500 to 600(Hv[50 gf]), the Vickers hardness of the layer of iron plating where the aforementioned borane is added therein is as high as 600 to 900(Hv[50 gf]).

It has been also confirmed that the deviation in thickness of the layer of iron plating all over the inner wall surface is confined within 15 $\mu$m, and that the layer of iron plating can be adhered with high precision in conformity with the dimension of cutting work.

Therefore, it is now possible, according to the present invention, to provide a cylinder for an internal combustion engine, wherein the inner wall surface of the cylinder which constitutes a slide-contacting surface for the piston is treated with an iron plating which is minimal in burden to the environment, excellent in abrasion resistance and hard enough to endure the practical use of the cylinder, thus making it possible to dispense with a finishing work such as honing work. Further, it is also possible, according to the present invention, to provide a method of treating the inner wall surface of the cylinder, which is capable of obtaining an excellent cylinder as described above.

DETAILED DESCRIPTION OF THE INVENTION

One embodiment of the cylinder for an internal combustion engine according to the present invention will be explained in detail with reference to the drawings.

Figure 2:
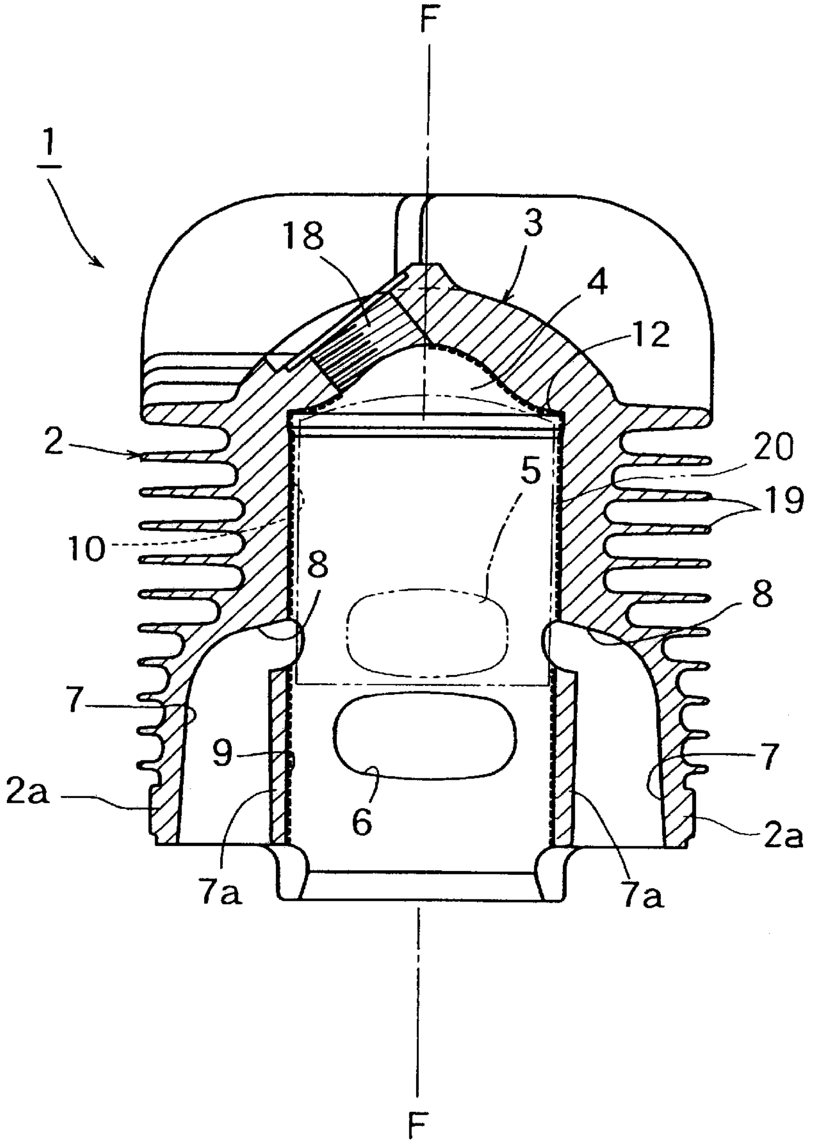
FIG. 2 is a longitudinal sectional view illustrating one embodiment of the cylinder for an internal combustion engine.

As in the case of the cylinder shown in FIG. 2, the cylinder for an internal combustion engine according to this embodiment is adapted to be employed in a small air-cooled two-stroke gasoline internal combustion engine (displacement: about 20–150 mL) to be employed in a portable power working machine such as a brush cutter or a chain saw. However, while the cylinder shown in FIG. 2 is constructed such that the scavenging passageway 7 is formed of a hollow scavenging passageway having an inner wall 7*a*, the cylinder according to this embodiment is not provided with the inner wall 7*a* (the inner wall surface 9 side of the cylinder is opened). Since the features other than this inner wall surface 9 side are substantially the same as those of FIG. 2, this embodiment will be explained as follows with reference to the cylinder 1 shown in FIG. 2.

The cylinder according to this embodiment was manufactured by a process wherein a crude cylinder was cast-molded from an aluminum alloy by means of a high-pressure die casting method, and then the inner wall surface 9 thereof was cut-worked into a predetermined dimension so as to enable the piston to move slidably therein, which was followed by an electroplating of the inner wall surface 9 by making use of a conventional iron plating apparatus employing an iron plating solution containing therein trimethylamine borane (TMAB), i.e. a boron compound, thereby forming an iron plating layer 10 so as to enhance the abrasion resistance of the inner wall surface 9. In this case, trimethylamine borane was added at a ratio of 0.5 g/L (the iron plating solution) (a preferable range of the ratio of trimethylamine borane is 0.1 to 1.0 g/L).

Next, this aluminum alloy cylinder for an internal combustion engine, whose inner wall surface 9 to be slidably contacted with the piston was electroplated in a plating bath comprising an iron plating solution containing trimethylamine borane as described above, was investigated with respect to the characteristics and features of the iron plating layer 10 formed on the inner wall surface 9. The results obtained will be explained below.

The hardness of the iron plating layer 10 was measured by making use of a micro-Vickers hardness meter MVK-H1 (available from AKASHI Co. Ltd.). As a result, while the Vickers hardness of the layer of iron plating where the aforementioned trimethylamine borane was not added therein was found about 500 to 600(Hv[50 gf]), the Vickers hardness of the layer of iron plating where the aforementioned trimethylamine borane was added therein according to this embodiment was found as high as 600 to 900(Hv[50 gf]).

Figure 1:
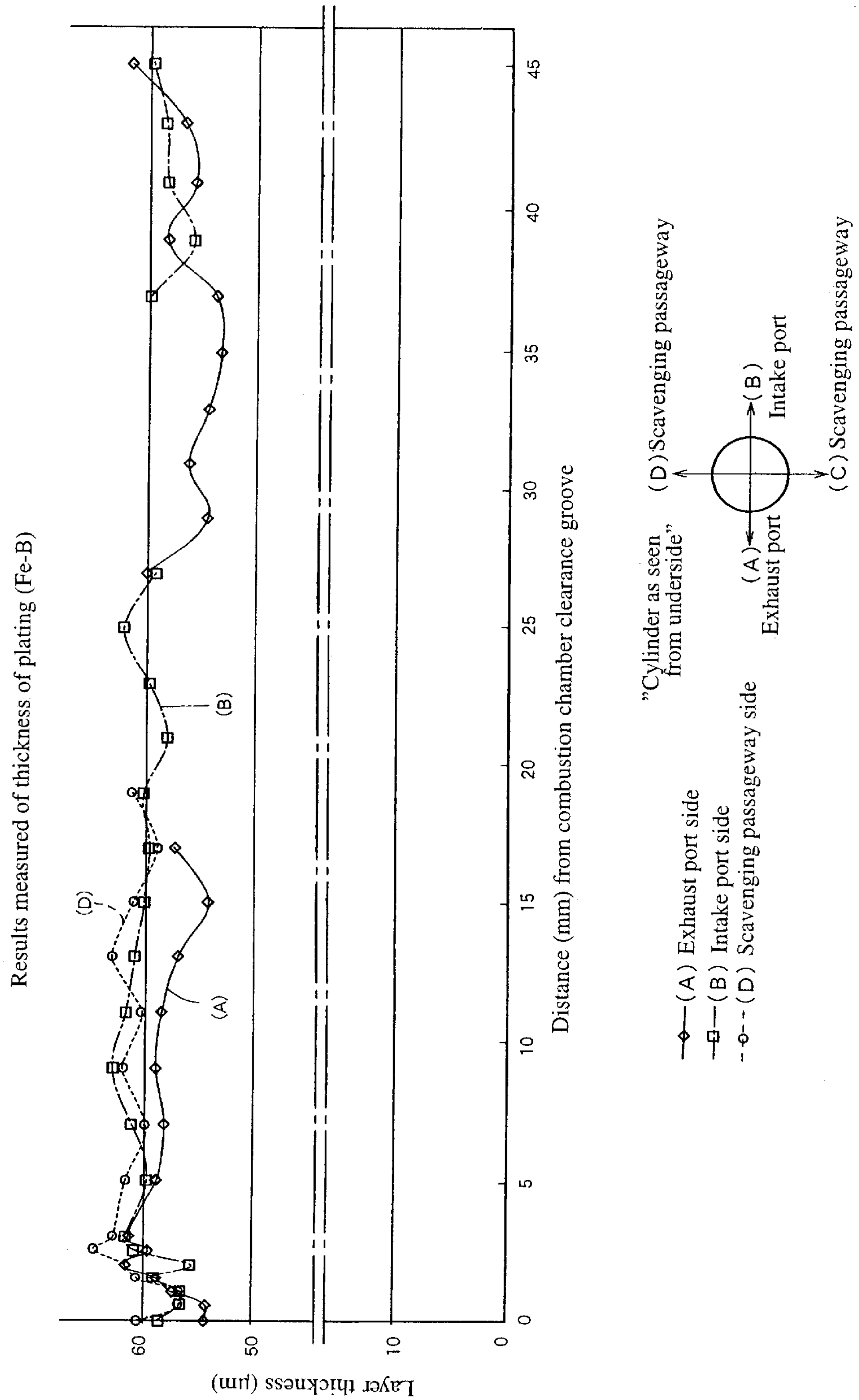
FIG. 1 is a graph showing the results of the distribution of the thickness of the layer of plating, which were obtained through the measurement of the thickness of the layer of plating in one embodiment of the cylinder for an internal combustion engine according to the present invention.

Further, the thickness of the iron plating layer 10 was measured so as to investigate the distribution of the thickness, the results being illustrated in the graph of FIG. 1. In this FIG. 1, the ordinate represents the layer thickness ($\mu$m), and the abscissa represents the distance (mm) as measured from a clearance groove 12 for working the combustion chamber (see FIG. 2). In this FIG. 1, the thickness of the iron plating layer 10 all over the inner wall surface 9 is represented by lines, i.e. by the line (A) for the region disposed on the exhaust port 5 side; by the line (B) for the region disposed on the intake port 6 side; and by the line (D) for the region disposed on the scavenging passageway 7 (scavenging port 8) side. Since the regions corresponding to the exhaust port 5, the intake port 6 and the scavenging passageway 7 (opening) were of course not subjected to the metal plating, these regions are made vacant in each of these lines (A), (B) and (D). As seen from this graph, the layer thickness of every regions of the iron plating layer 10 according to this embodiment was confined within the range of 52 to 65 $\mu$m, so that the deviation in layer thickness in every regions was confined within 15 $\mu$m. Furthermore, the iron plating layer 10 was found as being adhered with high precision in conformity with the dimension of cutting work. Therefore, it was possible, according to the cylinder of this embodiment, to dispense with a finishing work such as honing work.

While in the foregoing one embodiment of this invention has been explained in details for the purpose of illustration, it will be understood that the construction of the device can be varied without departing from the spirit and scope of the invention.

For example, while trimethylamine borane was employed in the aforementioned embodiment, it is possible to employ other kinds of boron compounds such as dimethylamine borane.

As apparent from the above explanation, according to the present invention, it is possible to provide a cylinder for an internal combustion engine, wherein the inner wall surface of the cylinder which constitutes a slide-contacting surface for the piston is treated with a metal plating which is minimal in burden to the environment, excellent in abrasion resistance and hard enough to endure the practical use of the cylinder, thus making it possible to dispense with a finishing work such as honing work: It is also possible, according to the present invention, to provide a method of treating the inner wall surface of the cylinder, which is capable of obtaining such an excellent cylinder as described above.

What is claimed is:

1. A cylinder for an internal combustion engine, which is made of an aluminum alloy and wherein an inner wall surface of said cylinder which is adapted to be slidably contacted with a piston is electroplated in a plating bath comprising an iron plating solution containing a boron compound wherein the boron compound is selected from the group of trimethylamine borane and dimethylamine borane.

2. The cylinder according to claim 1, wherein a layer formed on said inner wall surface by said electroplating is employable, as it is, as a finished surface without a finishing-work.

3. The cylinder according to claim 2, wherein the layer formed by said electroplating has a Vickers hardness of 600 to 900(Hv[50 gf]).

4. The cylinder according to claim 3, wherein a deviation in thickness of the layer formed by said electroplating all over said inner wall surface is confined within 15 $\mu$m.

5. The cylinder according to claim 4, which is adapted to be used as a cylinder for a small air-cooled two-stroke gasoline internal combustion engine to be employed in a portable power working machine, said cylinder being constructed such that a head portion constituting the combustion chamber of the engine is formed integral with a barrel portion into which the piston is slidably inserted.

6. A cylinder for an internal combustion engine, which is made of an aluminum alloy and wherein an inner wall surface of said cylinder which is adapted to be slidably contacted with a piston is electroplated in a plating bath comprising an iron plating solution containing a boron compound, wherein a layer formed on said inner wall surface by said electroplating is employable, as it is, as a finished surface without a finishing-work.

7. A method of treating the inner wall surface of the cylinder for an internal combustion engine, said method comprising a step of an inner wall surface of said cylinder which is adapted to be slidably contacted with a piston is electroplated in a plating bath comprising an iron plating solution containing a boron compound wherein the boron compound is selected from the group of trimethylamine borane and dimethylamine borane.

* * * * *